April 12, 1960
W. WOODZICK
2,932,116
FISHHOOKS
Filed April 22, 1958
2 Sheets-Sheet 2
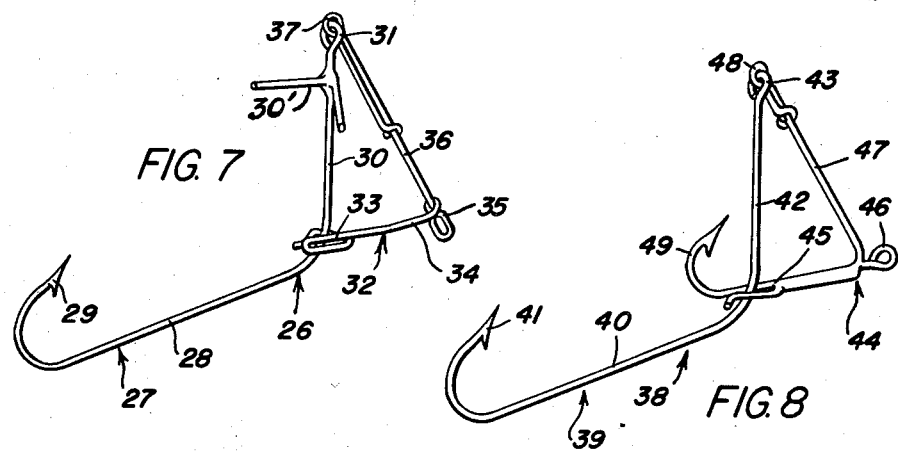
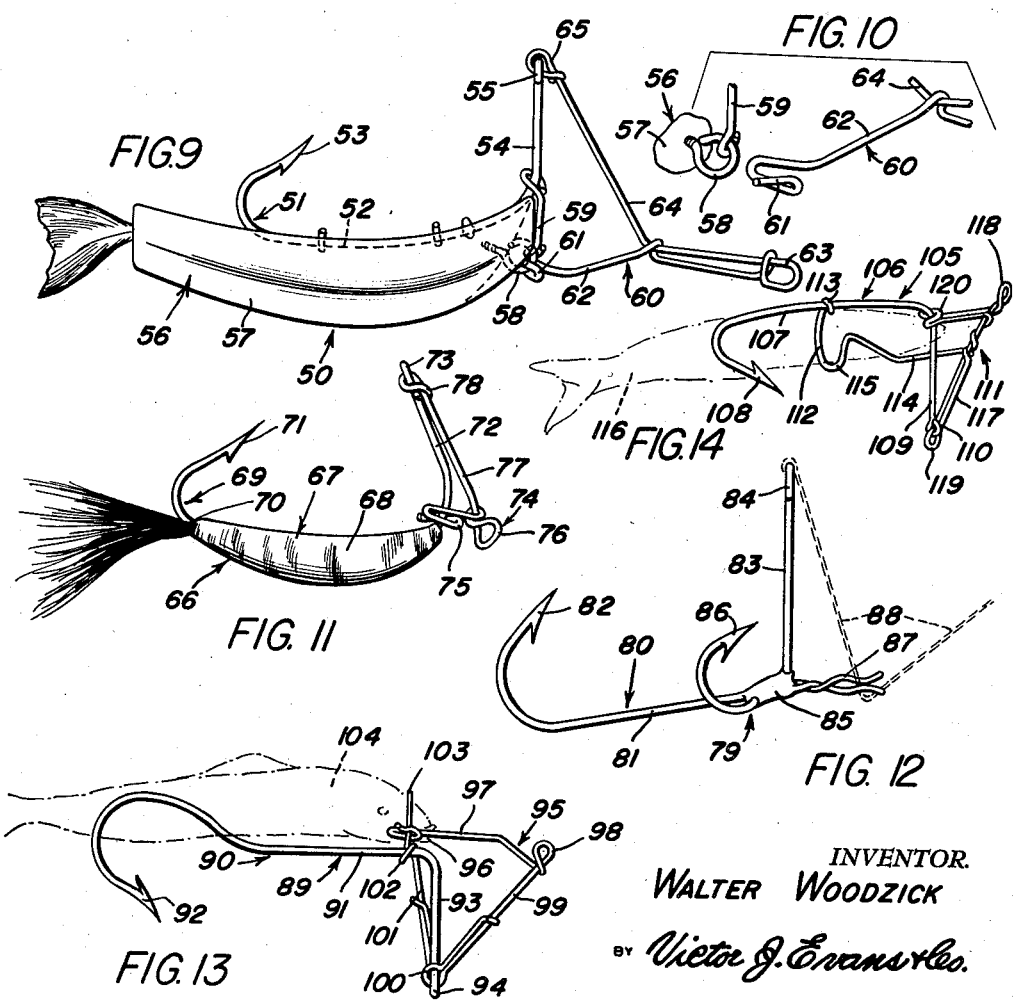
INVENTOR.
WALTER WOODZICK
BY Victor J. Evans & Co.
ATTORNEYS United States Patent Office 2,932,116
Patented Apr. 12, 1960

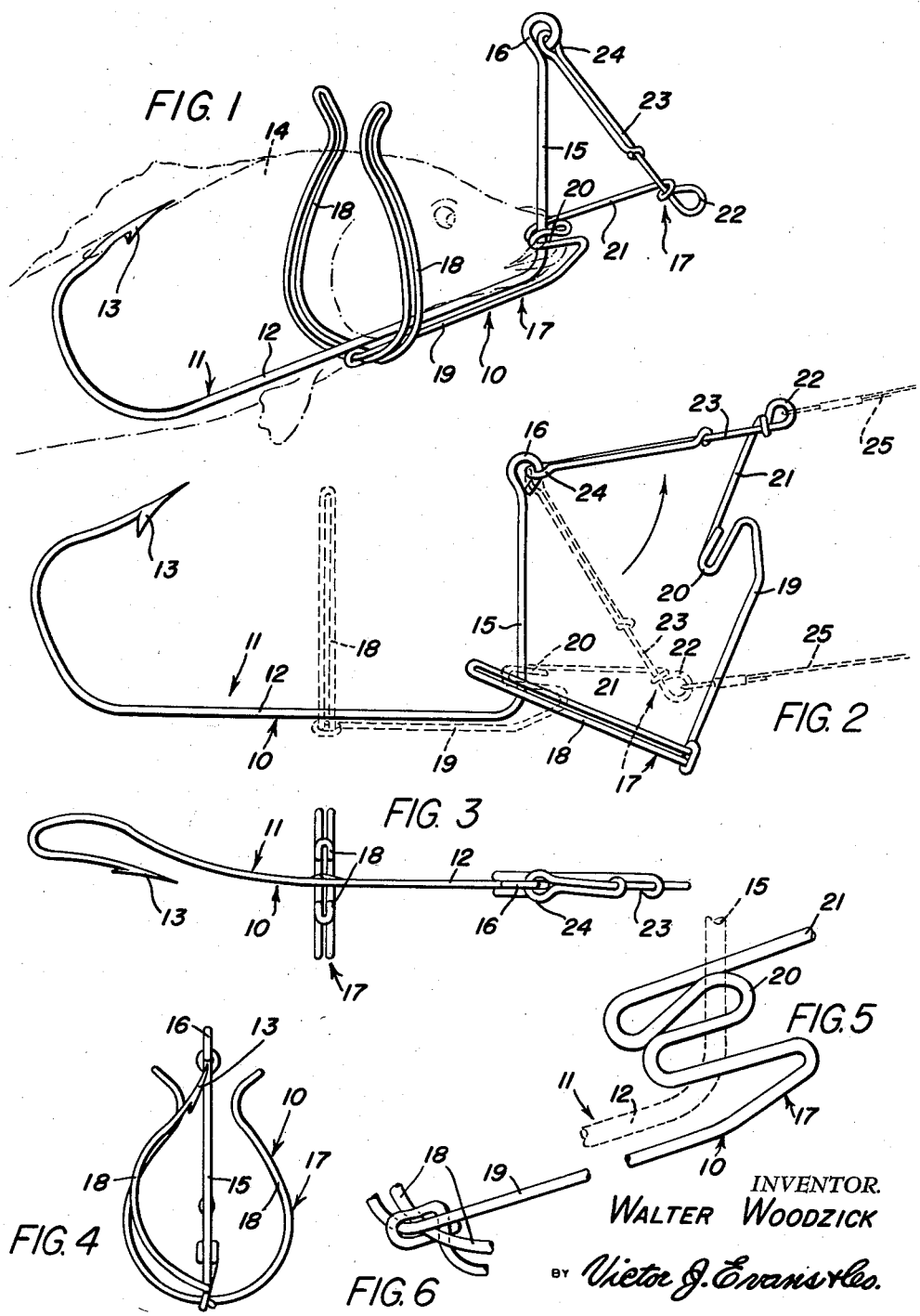

2,932,116

FISHHOOKS

Walter Woodzick, Hazelhurst, Wis.

Application April 22, 1958, Serial No. 730,193

6 Claims. (Cl. 43—44.6)

This invention relates to fishing equipment, and more particularly to a novel fishhook assembly.

The object of the invention is to provide a fishhook assembly which includes a device that will permit the hook to move into a more efficient gripping relation with respect to a fish, after a strike has been made.

Another object of the invention is to provide a fishhook assembly which includes a fishhook that has a clamp releasably connected thereto, so that when a fish strikes the barb of the hook, pressure on the fishing line will release the clamp from the hook so as to permit the hook to move into a better or more efficient holding or gripping position with respect to the fish to be caught.

A further object of the invention is to provide a fishhook assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view illustrating one form of the fishhook assembly of the present invention.

Figure 2 is a side elevational view of the assembly of Figure 1.

Figure 3 is a view taken at right angles to the view shown in Figure 2.

Figure 4 is an end elevational view of the assembly of Figures 1, 2 and 3.

Figure 5 is a fragmentary perspective view illustrating certain constructional details of the assembly of Figure 1.

Figure 6 is a fragmentary perspective view, with parts broken away and in section, showing the formation of the jaws on the support member which are adapted to engage a piece of bait such as a minnow or the like.

Figure 7 is a perspective view illustrating a modified fishhook assembly.

Figure 8 is a perspective view of another modification.

Figure 9 is a side elevational view of a further modification.

Figure 10 is a fragmentary sectional view, illustrating certain constructional details of the assembly of Figure 9.

Figure 11 is a side elevational view of a still further modification.

Figure 12 is a perspective view of a further modification.

Figure 13 is a side elevational view illustrating a still further modification.

Figure 14 is an elevational view of a still further modification.

Referring in detail to the drawings, and more particularly to Figures 1 through 6 of the drawings, there is shown a device 10 which includes a fishhook 11, and the fishhook 11 comprises a shank 12 which has a barb 13 on the upper rear portion thereof. The numeral 14 indicates in broken lines a piece of bait such as a minnow which can be used with the device 10. Extending upwardly from the front end of the shank 12 and secured thereto or formed integral therewith is a right angularly arranged stem portion 15 which has an eye 16 on the upper end thereof.

As shown in Figures 1 through 6 there is further provided a support member which is indicated generally by the numeral 17, and the support member 17 is adapted to be fabricated of a single piece of material such as wire. The support member 17 includes a pair of jaws 18 which are arranged in spaced apart relation with respect to each other, and the jaws 18 are adapted to clampingly engage the bait 14.

Extending forwardly from the lower ends of the jaws 18 is a first portion 19 which terminates in a clamp 20 that is adapted to releasably engage the lower end of the stem portion 15. Extending forwardly from the clamp 20 is a second portion 21 which terminates in an eyelet 22, and the eyelet 22 is adapted to have a fishline 25 connected thereto. Extending upwardly and rearwardly from the eyelet 22 is a third portion 23 which has its upper end 24 connected to the eye 16. It is to be noted that with the parts arranged as shown in the drawings, that when sufficient pressure is exerted, the stem portion 15 will be pulled loose from the clamp 20 so that the parts can move from the position shown in Figure 1 to the position shown in Figure 2.

Referring now to Figure 7 of the drawings, there is shown a modified device which is indicated generally by the numeral 26, and the device 26 includes a fishhook 27 which includes a shank 28 that is provided with a rearwardly arranged barb 29. Extending upwardly from the front portion of the shank 28 is a stem portion 30 which has an eye 31 on the upper end thereof.

As shown in Figure 7 there is further provided a support member 32 which includes a clamp 33 that is releasably connected to the stem portion 30, and the support member 32 further includes a first portion 34 which terminates in an eyelet 35 for connection to a fishing line. Extending upwardly and rearwardly from the eyelet 35 is a second portion 36 which is connected to the eye 31 as at 37.

Referring now to Figure 8 of the drawings, there is shown a modified fishing accessory which is indicated generally by the numeral 38, and the accessory 38 includes a fishhook 39 which includes a shank 40 which has a barb 41 thereon. The fishhook 39 further includes an upwardly extending stem portion 42 which is provided with an eye 43. The numeral 44 indicates a support member which has a clamp 45 that releasably engages the stem portion 42, and the support member 44 is provided with an eyelet 46 for connection to a fishing line. Extending upwardly and rearwardly from adjacent the eyelet 46 is a portion 47 which is connected to the eye 43 as at 48. Spaced rearwardly from the clamp 45 and connected to the support member 44 is a barb 49.

Referring now to Figures 9 and 10 of the drawings, there is illustrated a further modified accessory which is indicated generally by the numeral 50, and the accessory 50 includes a fishhook 51 which has a shank 52 that is provided with a barb 53 on the upper end thereof. The fishhook 51 further includes a forwardly arranged upwardly extending stem portion 54 that has an eye 55 on the upper end thereof.

In Figure 9 the numeral 56 indicates a lure which includes a body portion 57 that may be made of any suitable material such as wood or plastic, and extending forwardly from the body portion 57 and connected thereto is an eyebolt 58. A brace 59 has one end connected to the eyebolt 58, while the upper end of the brace 59 is connected to the stem portion 54 of the hook 51. The numeral 60 indicates a support member which has a clamp 61 that releasably engages the eyebolt 58, and the support member 60 further includes a forwardly arranged eyelet 63 for connection to a fishing line. Extending rearwardly and upwardly from the eyelet 63 is a second portion 64 which is provided with a loop 65 that is connected to the eye 55, and the connection between the members 65 and 55 provides a pivot or swivel connection so that when the clamp 61 separates from the eyebolt 58, the loop 65 can pivot or swing on the eye 55.

Referring now to Figure 11 of the drawings, there is illustrated a further modified device 66 which includes a lure 67 that is provided with a body portion 68 which may be made of any suitable material such as metal or plastic or wood or the like, and the numeral 69 indicates a fishhook which has a shank 70 that is secured to the lure 67. The fishhook is provided with an upwardly extending rearwardly disposed barb 71 as well as a forwardly disposed upwardly extending stem portion 72, and the stem portion 72 has an eye 73 on its upper end. The numeral 74 indicates a support member which has a clamp 75 that is releasably or detachably connected to the stem portion 72, and the support member 74 further includes an eyelet 76 for connection to a fishing line. Extending upwardly and rearwardly from the eyelet 76 is a portion 77 which is provided with a loop 78 that is connected to the eye 73.

Referring now to Figure 12 of the drawings, there is illustrated a further modified device which is indicated generally by the numeral 79, and the device 79 includes a fishhook 80 which is provided with a shank 81, and the shank 81 has an upwardly extending rearwardly disposed barb 82 as well as an upwardly extending forwardly disposed stem portion 83, and an eye 84 is arranged on the upper end of the stem portion 83. The numeral 85 indicates a support section which is secured at the juncture of the stem section 83 and shank 81, and a barb 86 extends rearwardly and upwardly from the supporting section 85. The numeral 87 indicates a jaw portion or clamp which extends forwardly from the support section 85 and which is secured thereto, and the numeral 88 indicates in broken lines a fishing line which is adapted to be releasably held in the clamp 87, the fishing line being connected to the eye 84.

Referring now to Figure 13 of the drawings, there is illustrated a modified fishing accessory which is indicated generally by the numeral 89, and the accessory 89 includes a fishhook 90 which is provided with a shank 91 that has a barb 92 extending downwardly from the rear end thereof. The hook 90 further includes a forwardly arranged downwardly extending stem portion 93 that is provided with an eye 94 on the lower end thereof. The numeral 95 indicates a movable support member which includes a clamp 96 as well as a first portion 97 that terminates in an eyelet 98 for connection to a fishing line. A second portion 99 extends downwardly and rearwardly from the eyelet 98, and the portion 99 terminates in a loop 100 which engages the eye 94. Extending upwardly from the loop 100 is a third portion 101 which is provided with a coiled portion 102 that surrounds the shank 91, and extending upwardly from the coiled portion 102 is a fourth portion 103 which may be impaled on a piece of bait such as a minnow 104.

In Figure 14 there is shown a still further modified fishing accessory which is indicated generally by the numeral 105, and the accessory 105 includes a fishhook 106 that has a shank 107 which is provided with a barb 108 that extends downwardly from the rear end thereof. The numeral 109 indicates a stem portion which projects downwardly from the front end of the shank 107, and an eye 110 is formed on the lower end of the stem portion 109. The numeral 111 indicates a movable support member, and the support member 111 includes a first portion 112 which extends downwardly from and which is connected to the shank 107 as at 113. A second portion 114 is provided on the support member 111, and the numeral 115 indicates a gripping portion on the support member which can be used for gripping a piece of bait such as the bait 116. There is further provided on the support member 111 a third portion 117 which has an eyelet 118 on its upper end for connection to a fishing line, and the lower end portion 119 of the portion 117 is connected to the eye 110. A clamp 120 is arranged rearwardly of the third portion 117, and the clamp 120 releasably or detachably engages the stem portion 109.

It is to be noted that according to the present invention in all forms of the fishing tackle, a slip trip hook arrangement is provided so that when the clamp slips off of the fishhook stem, the hook will be in proper position. When the device is being used for casting bait, the assembly will function as a weedless fishhook so that the point of the hook will be guarded. When the clamp slips off of the fishhook stem, as when a fish strikes or when pressure is on the point of the hook, the clamp or slip catch slides off and the hook is then in holding position.

Another important advantage of the present invention is that when a fish strikes the bait, it forces the point of the hook into a straighter angle than when used in the customary way. Also, the act of closing the mouth by the fish over the point and shank forces the point or barb straighter into the opposite jaw of the fish and when the barb is forced into the jaw of the fish, the pull of the fish or the pull of the fisherman pulls the clamp or slip catch out and the hook is then in holding position so that as shown in Figure 2 for example, the hook is in the position of a conventional hook. This arrangement is especially ideal for casting and trolling. The device can be used with artificial bait as well as with live bait. Furthermore, the hook assembly can be used for still fishing or ice fishing, and the hook may be pierced through the tail of any suitable bait or it can be run along the bottom of the bait and then pierced through a suitable portion of the bait such as a minnow. A long stiff leader can be used for keeping the bait in a horizontal position. When the fish takes the bait, the pull of the fish will release the clamp from the stem portion so that the hook will be in proper position to hold a fish. This arrangement insures that there will be instant hooking instead of waiting until the fish turns the bait and it also leaves the hook free of the semi-stiff leader so that the fish has less leverage to throw the hook.

If desired, the device may be provided with an adjustable slip catch or adjustable clamp and the parts can be made of any suitable material such as wire or metal. In Figure 12 the line 88 itself is connected to the clamp 87, whereas in an arrangement such as that shown in Figure 1, the clamp 20 engages the stem portion 15 of the hook 11. A stop can be added on the shank of the hook to keep the bait in proper position so that this bait will not slip out of its proper position.

The assembly of the present invention insures that the hooks will be weedless and snagging of the hooks is prevented. After release, the hook functions as a normal or conventional hook. The clamp may be made as an integral part of the hook as for example as shown in Figure 12 so that the line 88 can be attached to eye 84 and then passed through the clamp or slip catch 87 and then when there is sufficient pressure exerted, the line 88 will be withdrawn from the clamp 87.

As previously stated, the device can be used with bait such as a minnow or else it can be used with an artificial lure such as the lure 50 or the lure 66 shown in Figures 9 or 11. The arrangements shown in Figures 9 and 11 may be used with streamer flies. The barbs may be arranged so that they point down or up and also a float can be used with the device if desired. With the parts arranged as shown in Figure 4, the minnow or bait can slip by the shank when the point is occupied by the jaw of the fish so that the minnow can clear the shank to permit deep penetration by the barb. Thus, when a fish is hooked, the minnow or bait will clear the hook and the minnow can be held by the jaws 18. The principle of the present invention is intended to cover the use of a hook on the upright shank instead of impaling the minnow on the shank itself.

It is to be noted that in the fishing tackle 10 of Figures 1 through 6, the clamp or catch 20 is releasably or detachably connected to the stem 15, so that when there is sufficient pressure exerted, a line attached to the eyelet 22 will cause the part to separate and move from the position shown in Figure 1 to the solid line position shown in Figure 2. Then, when the fish has been removed from the hook, the parts can then be returned from the solid line position shown in Figure 2 to the dotted line position shown in Figure 2 so that the device can be used over and over again. The bait 14 may be held in place between the jaws 18, and the support member 17 may be fabricated of a single piece of bendable wire or the like.

In Figure 7, when the barb 29 becomes snagged on a rock, or when a fish is caught on the barb 29, it will be seen that with a fishing line attached to the eyelet 35, that when sufficient pressure is exerted, the clamp 33 will separate from the stem 30 so that the support member 32 can pivot on the eye 31.

Similarly, in Figure 8 when sufficient pressure is exerted, a fishing line attached to the eyelet 46 will separate the support member 44 so that the clamp 45 will separate from the stem portion 42 and the interconnection of the parts 48 and 43 provide a swivel joint.

In Figures 9 and 10 the principle of the present invention is shown applied to a lure such as the lure 56, so that with a fishing line attached to the eyelet 63, it will be seen that when a fish strikes the hook 51, the barb 53 will become impaled in the fish, and the clamp 61 will separate from the eyebolt 58 so as to insure that the hook 51 becomes more firmly embedded in the jaws or other portion of the fish, whereby a better grip or holding action on the fish is obtained.

Similarly, when using the device 66 shown in Figure 11, the lure 67 provides a means of attracting fish to the hook 69, and when the fish becomes impaled on the hook 69, the line attached to the eyelet 76 will cause the clamp 75 to separate from the stem 72 so that the hook 69 will turn or move sufficiently to insure that the barb 71 will become more deeply impaled or pierced into the fish whereby the fish will be more firmly gripped or held.

In Figure 12 there is illustrated a simplified arrangement wherein the fishing line 88 itself engages the clamp 87, and there is provided two barbs 82 and 86 so that when a fish engages either of these barbs 82 and 86, the line 88 can separate from the clamp 87 so as to permit the barbs to be rotated slightly whereby the barbs can penetrate more deeply into the mouth or other portions of the fish.

In Figure 13 the device 89 is constructed so that the support member 95 can swivel on the eye 94, and the clamp 96 is adapted to separate from the portion 103, when a sufficiently large fish is caught, or when for example a rock is snagged by the barb 92, so that such an arrangement will permit the hook 90 to move sufficiently whereby the fishhook can clear the rock or other obstruction.

In Figure 14 the portion 115 is adapted to provide a gripping element for the bait 116, and the support member 111 is adapted to pivot on the eye 110, and the clamp 120 of the support member 111 releasably engages the portion 109 of the fishhook 106.

In Figure 7 an additional weed and snag preventing guard is adapted to be soldered to the parts 30 below the elements 37 and 31 so as to add additional anti-snagging clearance, and this guard is indicated by the numeral 30'.

In Figure 9 the body 50 or bait is to be attached to the shank 52 by pressure so that when the fish is caught the body 50 is released and is free of the hook assembly, but is connected to the hook assembly by the part 59 so that the entire assembly can be retrieved with the fish and can be reset for further use. This feature is so that if a heavy body 50 such as a spoon or other solid artificial bait is used, there will not be a solid weight leverage so that it will be impossible for a fish to throw artificial bait in view of the fact that the bait is free to swing on the shaft and does not solidly connect to the shaft. The shaft 52 is removable from the body 50 by means of the application of pressure or strain thereto. In other words, a clamp is provided for holding the bait in position while casting. Stop members may be used to keep the member from slipping off the shank such as the member 50 from slipping off of the shank or shaft 52. When released, the body 50 is free swinging and the small eyelet or member 59 prevents the loss of the body 50 since the barb keeps it from slipping off.

In Figure 1 the clamp 20 is to be set or arranged so that it can be slipped into the mouth of the bait in lieu of a hook to hold the forward portion of the bait on the shaft 15. The holder 13 is on the same clamp because with the holder in position it keeps the minnow in proper place along the shaft and this feature together with the previously described features insures that the clamp 20 will hold the bait properly where it belongs above the shaft as illustrated.

The clamp 61 shown in Figure 9 permits freedom from a solid construction when the bait is shaken off of the shaft. This feature is important since if a person wanted to use several different baits at different times on the same assembly, it would be possible to make the member 59 in such a manner that it can be snapped onto either or both elements 54 or 50 with a snap instead of with a solid two eyelet arrangement.

The clamp 96 may be used in the mouth of the minnow to hold the front of the minnow to properly follow the line, and the shaft 103 with its construction, serves to keep the minnow in proper position and also permits a slight back and forth movement so that an arrangement as shown in Figures 13 or 14 prevents the minnow from acquiring a flabby appearance or stretched appearance.

The arrangement shown in Figure 13 may be used for streamer flies or with artificial bait. In Figure 14 the holder is arranged so that the bait can be held forward as for example by means of the element 120, and the minnow is held on the shaft 107 so that the back end of the minnow has a chance to weave in a natural manner so that the holder does not interfere with the natural wiggle when the bait is worked with the action of a rod tip.

When the clamp 120 of Figure 14 slips off, the curve on the holder stem 114 forces the holder and minnow clear off of the shaft. The minnow will have a considerable amount of freedom to move and the minnow will be held in such a manner that it will not readily disintegrate. The present invention can be used by skilled or unskilled fishermen and when the fish becomes hooked and tries to pull away, the assembly becomes unhinged so that a highly efficient strike can be made. The device is arranged so that the hook is where the fish grabs the bait and the bait looks natural to the fish.

Minor changes in shape, size and rearrangement of details coming within the field of invention claimed may be resorted to in actual practice, if desired.

I claim:

1. In a device of the character described, a fishhook including a shank provided with a barb on one end thereof, a stem portion extending upwardly at right angles to said shank, an eye on the upper end of said stem portion, a support member fabricated of a single piece of material and shaped to include jaws for engagement with a piece of bait, a first portion extending from said jaws and terminating in a clamp for releasably engaging said stem portion, a second portion extending from said clamp and terminating in an eyelet for connection to a fishing line, a third portion extending from said eyelet and engaging the eye on the upper end of said stem portion.

2. In a device of the character described, a fishhook including a shank provided with a barb on an end thereof, a right angularly arranged stem portion extending from said shank, and an eye on the upper end of said stem portion, a support member including a clamp releasably engaging said stem portion, a first portion extending from said clamp and terminating in an eyelet for connection to a fishing line, and a second portion extending from said eyelet and engaging the eye on said stem portion.

3. In a device of the character described, a fishhook including a shank provided with a barb on an end thereof, a right angularly arranged stem portion extending from said shank, and an eye on the upper end of said stem portion, a support member including a clamp releasably engaging said stem portion, a first portion extending from said clamp and terminating in an eyelet for connection to a fishing line, and a second portion extending from said eyelet and engaging the eye on said stem portion, and a barb integral with and extending from the support member adjacent the clamp.

4. In a device of the character described, a lure including a body portion, a fishhook having a shank extending along the upper surface of said body portion and said shank terminating in a barb, a stem portion extending upwardly from said shank and said stem portion terminating in an upper eye, an eyebolt extending forwardly from said body portion, a brace extending between said eyebolt and stem portion, a support member including a clamp releasably engaging said eyebolt, a first portion extending from said clamp and terminating in an eyelet for connection to a fishing line, and a second portion extending from said eyelet and connected to said eye.

5. In a device of the character described, a lure including a body portion, a fishhook including a shank connected to said body portion, said shank being provided with a rearwardly disposed barb, a stem portion extending upwardly from said shank and terminating in an eye, a body member including a clamp releasably engaging said stem portion, a first portion extending forwardly from said clamp and terminating in an eyelet for connection to a fishing line, and a second portion extending upwardly from said eyelet and connected to said eye.

6. In a device of the character described, a fishhook including a shank having a downwardly extending barb on its rear end, a stem portion extending downwardly from the front end of said shank, an eye on the lower end of said stem portion, a support member including a first portion extending downwardly from and connected to said shank, a second portion extending forwardly from said first portion and terminating in a third portion, an eyelet on the upper end of said third portion for connection to a fishing line, the lower end of said third portion being connected to said eye, and a clamp extending rearwardly from said third portion for releasably engaging said stem portion.

References Cited in the file of this patent
UNITED STATES PATENTS

| | | |
|---|---|---|
| 2,150,874 | Wagner | Mar. 14, 1939 |
| 2,319,246 | Martin | May 12, 1943 |
| 2,533,390 | Miller | Dec. 12, 1950 |
| 2,727,330 | Huff | Dec. 20, 1955 |